United States Patent [19]

Le Berre et al.

[11] Patent Number: 4,464,020

[45] Date of Patent: Aug. 7, 1984

[54] SMECTIC LIQUID CRYSTAL DISPLAY DEVICE WITHOUT A NEMATIC PHASE

[75] Inventors: Serge Le Berre; Michel Hareng; Annie Beguin; Lydie Thirant, all of Paris, France

[73] Assignee: Thomson-CSF, Paris, France

[21] Appl. No.: 409,857

[22] Filed: Aug. 20, 1982

[30] Foreign Application Priority Data

Aug. 21, 1981 [FR] France ................. 81 16117

[51] Int. Cl.³ .............................................. G02F 1/137
[52] U.S. Cl. ................... 350/350 S; 350/351; 252/294.01
[58] Field of Search ................. 350/350 R, 350 S, 351; 252/299.01, 299.5, 299.65

[56] References Cited

U.S. PATENT DOCUMENTS

| | | | |
|---|---|---|---|
| 3,114,836 | 12/1963 | Fergason et al. | 350/351 X |
| 3,410,999 | 11/1968 | Fergason et al. | 350/351 X |
| 3,796,999 | 3/1974 | Kahn | 350/351 X |
| 3,988,056 | 10/1976 | Hareng | 350/351 |
| 3,999,838 | 12/1976 | Sprokel | 350/351 |
| 4,150,396 | 4/1979 | Hareng et al. | 350/351 X |
| 4,391,492 | 7/1983 | Lu et al. | 350/351 |
| 4,402,855 | 9/1983 | Zann et al. | 350/350 S X |

FOREIGN PATENT DOCUMENTS 2373076 6/1978 France .

OTHER PUBLICATIONS

Gary et al., "Materials Aspects of Termally Addressed Smectic and Cholesteric Liquid Crystal Storage Displays", Journal of Applied Physics, vol. 45, No. 10, Oct. 1974.

Michel Hareng et al., "Liquid Crystal Flat Display", International Electron Devices Meeting, Dec. 1978, Institute of Electrical and Electronics Engineers, Technical Digest, New York.

M. Hareng et al., "Electric Field Effects on Biphenyl Smectic A Liquid Crystals", Applied Physics Letters, vol. 25, No. 12, Dec. 1974.

Primary Examiner—John K. Corbin
Assistant Examiner—David Lewis
Attorney, Agent, or Firm—Oblon, Fisher, Spivak, McClelland & Maier

[57] ABSTRACT

The invention relates to matrix access display devices using a mixed thermal and electric effect and provides a display device with mixed thermal-electric drive using a smectic liquid crystal deprived of a nematic phase by addition of appropriate dopes.

5 Claims, 3 Drawing Figures

SMECTIC LIQUID CRYSTAL DISPLAY DEVICE WITHOUT A NEMATIC PHASE

BACKGROUND OF THE INVENTION

The present invention relates to liquid crystal cells and more particularly those using a smectic phase liquid crystal for display or image reproduction purposes.

Liquid crystal screens are systems modulating the incident light on the screen. It may be a question of flat screens with direct vision or matrix screens used with a strioscopic system for the projection of recorded images.

Liquid crystals are formed of long molecules able to be orientated under the effect of an electric field with greater or lesser ease depending on the conditions of application of the field. Liquid crystals are known which, at a high temperature, have an isotropic phase and, at a lower temperature, a succession of nematic and smectic phases.

In the case of smectic liquid crystal devices using a mixed thermal and electric effect, writing is achieved by applying an electric field during cooling of the liquid crystal from the isotropic phase to the smectic phase and during its passage into the nematic phase. A typical example of material used for this effect is cyano-octyl-4-4'-biphenyl of formula:

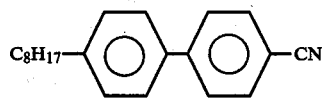

which presents the following phase transitions:

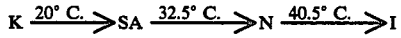

It will be noted that this material has a nematic phase extending over 8° C. If a display screen with such a material is maintained a little below the smectic-nematic transition temperature, it will be necessary to supply it with the heating power required for raising its temperature by about 10° or so. For reasons of control power gain, it is therefore recommended to reduce the nematic phase as much as possible and even to suppress it. Liquid crystals are known which are mixtures of several smectic materials, presenting up to a certain percentage of one of their components a nematic phase but which do not present such a phase beyond this percentage. Such materials may be used in laser beam display devices without application of an electric field. In fact, to remain within the electric field values able to be withstood by the liquid crystal layer, it is important for the field to be applied for a sufficiently long time for it to act efficiently, which is not possible with the materials known up to present and which do not have a nematic phase. The need to provide, in mixed thermal and electric effect devices, smectic liquid crystals having a nematic phase during the smectic-isotropic transition involves considerable heating power.

To overcome these drawbacks, use has been proposed of a smectic liquid crystal which, particularly by addition of specific dopes, no longer has a nematic phase but which can be written in nevertheless by a mixed thermal and electric effect. Contrary to what was believed, the suppression of the nematic phase does not have serious consequences. The introduction of such dopes into a smectic material modifies the operating characteristics and acts on the time during which the electric field may be applied.

SUMMARY OF THE INVENTION

The present invention relates to a display device which comprises a liquid crystal layer having a smectic phase, said layer being subjected to a mixed thermal and electric writing effect through heating means and electric field addressing means, in which said smectic liquid crystal does not have a nematic phase during smectic-isotropic phase transition.

BRIEF DESCRIPTION OF THE DRAWINGS

The invention will be better understood from the following description and accompanying figures in which.

DESCRIPTION OF THE PREFERRED EMBODIMENT

Figure 1:
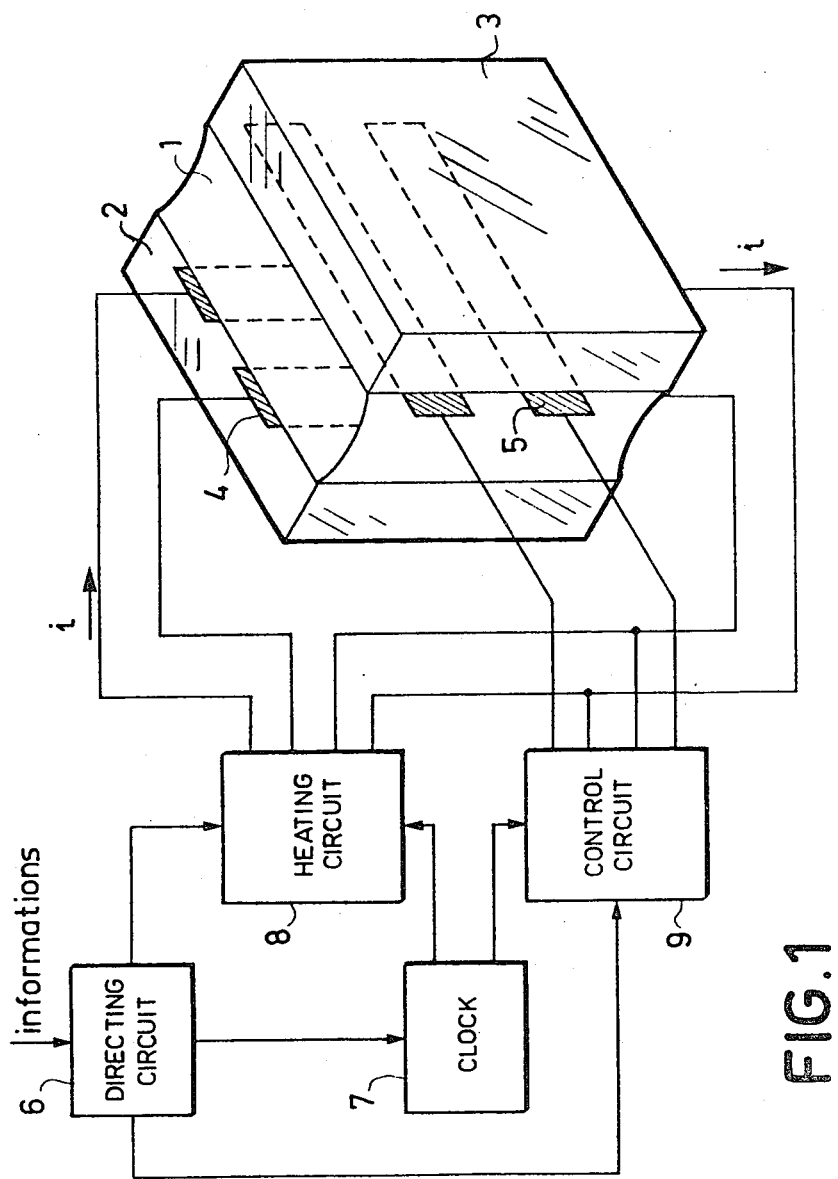
FIG. 1 shows a display device.

FIG. 1 shows a display device using the mixed thermal and electric writing effect. By way of non limiting example, in the device chosen which shows a matrix access screen, the thermal effect is caused by passing an electric current through heating strips. The display screen is formed from two plates 2 and 3 supporting respectively conducting parallel strips 4 and 5 which intersect orthogonally. A liquid crystal layer 1 is inserted between plates 2 and 3 in a space of about ten microns in thickness defined by shims, not shown. In this example, electrodes 4 which are the column connections of the display matrix are also the strips for heating the screen. Electrodes 5 are the line connections of this matrix. So as not to complicate the figure, only two lines and two columns of the screen have been shown. The incident electric signal representing the characters or image to be displayed is first of all received by a circuit 6 which separates the signals assigned to the lines from those assigned to the columns. The signals for applying the electric fields to each element of the screen defined by the intersection of a line and a column are fed to a line control circuit 9 having a buffer memory. The signals corresponding to control of the heating current in which flows successively through each column are directed to circuit 8. A clock 7 allows coordination of the electric control signals by its action on circuits 8 and 9 depending on the operations carried out by the separator circuit 6.

If a reflection screen is used, the solution may be contemplated which consists in choosing transparent line connections 5 and reflecting column connections 4. Electrodes 5 may be formed from a mixture of tin and indium oxides. Electrodes 4 may be made from aluminium. Plates 2 and 3 may be made from glass, at least plate 3 being transparent.

If a transmission screen is used, plates 2 and 3 are transparent and are made for example from glass. Electrodes 4 and 5 are also transparent and may be made from a mixture of tin and indium oxides.

It is known to manufacture smectic liquid crystals having no nematic phase during the smectic-nematic transition. However, because of the incoercible character of the smectic phase, the orientation of the molecules is practically unmodified by an electric field applied to such a material. To modify the orientation of the molecules of this material, it is admitted that this latter must have at least a small nematic phase during which the electric field is applied for orientating the molecules. This nematic phase provides the material with a greater capacity for reacting to an electric field which is applied thereto.

Figure 2:
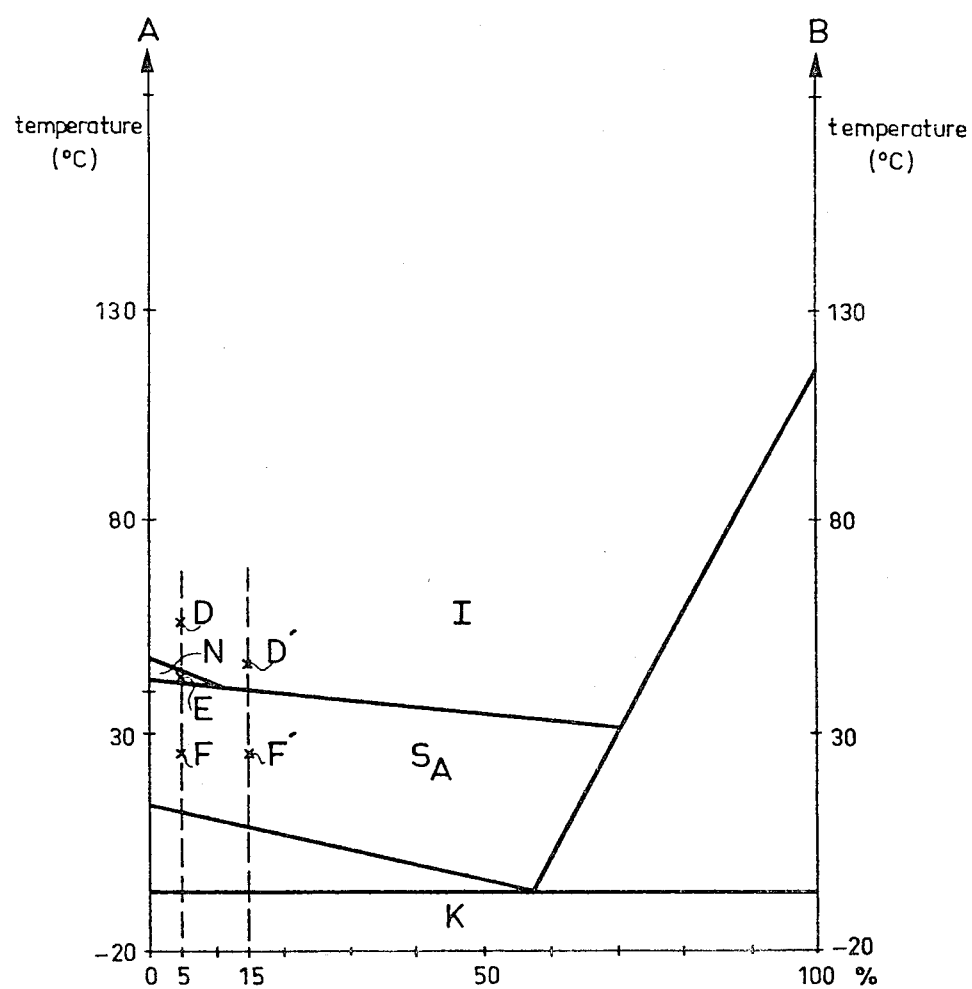
FIG. 2 is a phase diagram.

The invention consists more especially in introducing one or more dopes into a smectic material so as to make it suitable for reacting to an applied electric field. FIG. 2 is a binary phase diagram of a smectic material formed of a mixture of biphenyls which will be called part A:

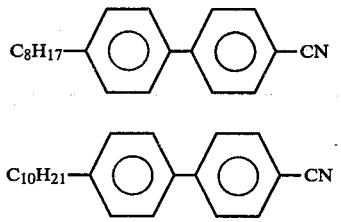

and which presents the following transitions:

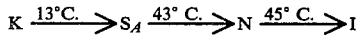

to which a dope is added, called part B: bicyclooctene-2.

It can be seen that the material has a small nematic phase which extends over 2° C. The purpose of introducing dope B is to further reduce the amplitude of the nematic phase and from a certain percentage to suppress it altogether. The phase diagram of FIG. 2 shows the different phase transitions of a compound of materials A and B. The abscissa of this diagram gives the concentration from 0 to 100% of material B in the mixture A+B. The ordinates of the diagram are graduated in degrees Celsius. It can be seen that the nematic phase is present up to a dope concentration of about 11% in the mixture. A typical example of use is a mixture of compounds A and B which comprises 15% of product B. Such a mixture melts at about 9° C., has a smectic phase from 9° C. to 40° C. then an isotropic phase.

FIG. 2 gives an example of a compound formed of 95% of material A and 5% of dope B. The succession of the phases of this compound is given by the broken straight line from abscissa 5%. At point D the compound is in the isotropic phase where the electric field has no effect. When the temperature of the compound decreases, the compound passes to the nematic phase where is located point E. It is then in this zone that in the known art the electric field acts efficiently. With the temperature still decreasing, the compound passes over into the smectic phase, for example at F, and keeps the diffusion condition which it received during its passage through the nematic phase.

On the other hand, a compound comprising 15% of material B as described above presents, in the operating range of the screen, two phases, the isotropic phase shown for example by point D' and the smectic phase shown by the point F'. Such a compound has proved capable of efficiently reacting to an electric field during the isotropic-smectic transition. The physical explanation of the phenomena inherent in these mixtures is fairly complicated, nevertheless an outline may be given concerning the application of the electric field for orientating the molecules. For a conventional smectic liquid crystal, the electric field has no action in the isotropic phase. On the other hand, it acts efficiently in the nematic phase during cooling of the liquid crystal. The electric field which cannot be too high in order to avoid breakdown of the liquid crystal layer must be applied for a certain length of time to act efficiently. In the known smectic material which do not have a nematic phase, the electric field did not have time to act during the isotropic-smectic transition. The addition of appropriate dopes increases the time $\tau$ during which the electric field is able to be applied up to normal values of use. This time $\tau$ is conditioned by the structure of the liquid crystal and not by external means.

A mixture such as the one described previously may be used advantageously for percentages of material B between, for example, 13 and 20% in matrix access screens. The nematic phase which was considered as indispensable in smectic liquid crystal screens using the mixed thermal and electric effect has disappeared. It has in fact been discovered that there exist materials whose orientation is possible without their having a nematic phase, this latter being more especially suppressed by the addition of specific dopes.

The use of smectic compounds in accordance with the invention, because of the absence of a nematic phase and/or because of the addition of dopes, provides a number of advantages which are the increase in contrast, the reduction of the control power and reduction of the video voltage.

Figure 3:
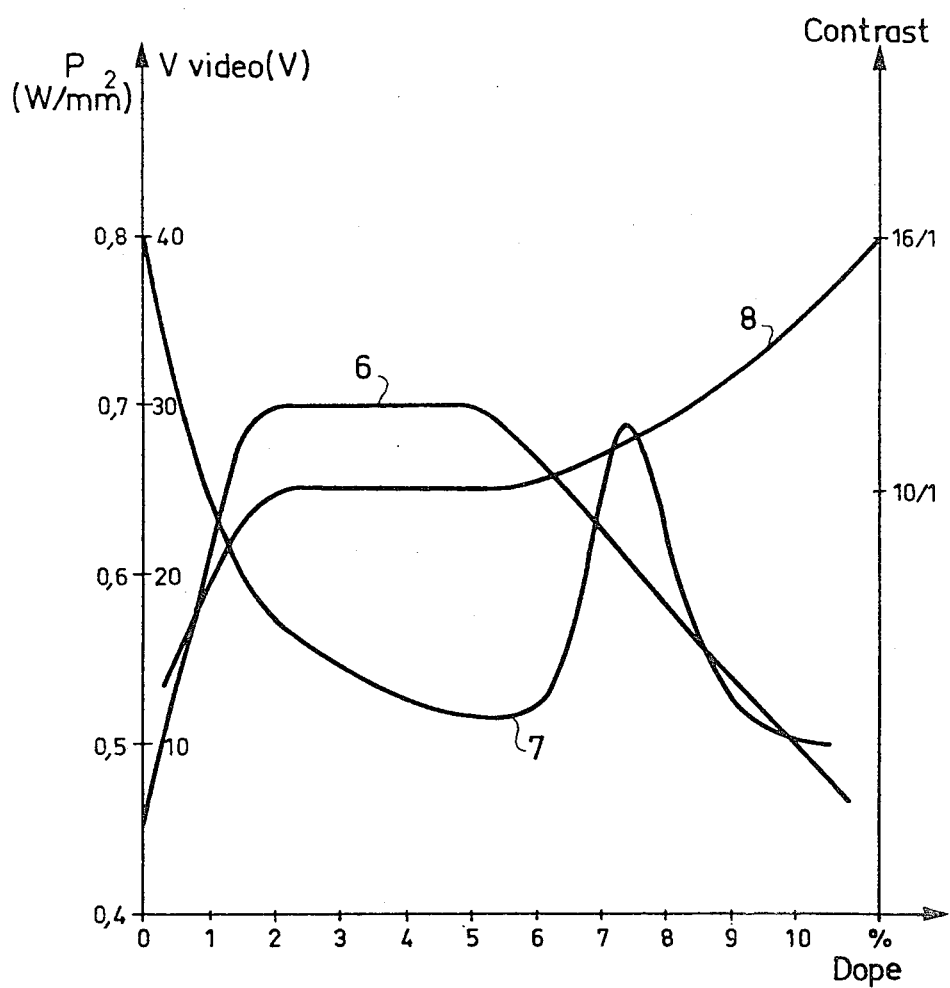
FIG. 3 is a diagram giving the trend of the control power, of the video voltage and of the contrast as a function of the percentage of dopes.

By way of non limiting example, several parameters have been noted representative of a compound in accordance with the invention. To illustrate the advantages which have just been mentioned, there is shown in FIG. 3 the trend of the control power, of the video voltage and of the contrast as a function of the percentage of dopes which the compound comprises. The control power is expressed in W/mm² and is represented by curve 7. It is the power required for bringing the liquid crystal layer to the temperature required for writing on or clearing the screen. The video voltage, represented by curve 6, is the writing or clearing voltage applied to the liquid crystal through the two electrode networks. The contrast expresses a brightness ratio and is represented by curve 8. Ideal operation will be that requiring minimum control power and maximum contrast for a low video voltage.

The material tested is a biphenyl mixture:

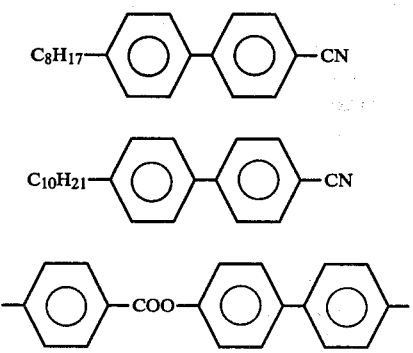

whose transitions are:

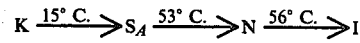

Specific dopes were added in proportions which may be high, up to 15%. An advantageous example of a dope is bicyclootene-2. Thus, the results may be compared for different concentrations of the dope. For a dope concentration of 2.5%, the nematic phase extends over about 1° C. For a dope concentration of 10%, there is no nematic phase at all.

Examination of the different curves of FIG. 3 reveals three distinct zones. A first zone for a mixture containing from 0 to about 2% of dope shows that the video voltage is low but the contrast is also low and the control power high. From 2 to about 6% of dope in the mixture the video voltage is high, the contrast is improved and the control power tends to diminish. For a concentration of dope from 9 to 10%, the liquid crystal presents certain advantages. In fact, for low video voltages and low control power, the contrast is very good. This is particularly advantageous for smectic liquid crystal screens. It should however be noted that the curve giving the control power as a function of the percentage of dope presents between 6 and 9% of dope a maximum which is difficult to explain. This abnormality may be avoided by operating at the right of this maximum. Lowering of the video voltage is an unexpected phenomenon which could be explained by an increase in time $\tau$ during which the electric field is operative.

The increase in contrast as a function of the percentage of dope could be explained by analogy with the phenomenon of cristallization from crystal seeds. The introduction of appropriate dopes inside the smectic liquid crystal would lead to multiplication of the defects inside the material which would result in the growth of diffusing zones of reduced size and so in increasing the contrast.

The smectic liquid crystal compound of the invention may also be used in mixed thermal and electric effect devices in which the thermal effect is provided by the impact of a laser beam on said layer, the electric field being applied between two electrodes enclosing said layer. The use of a smectic liquid crystal having no nematic phase in accordance with the invention and presenting the abovedescribed characteristics is particularly advantageous in matrix access display screens. The video voltage gain is about three, which allows the screen to be controlled by transistor circuits operating with conventional voltage values.

What is claimed is:

1. In a display device comprising a liquid crystal layer having a smectic phase, an isotropic phase, and a smectic-isotropic phase transition, said layer being subjected to a mixed thermal and electric writing effect through heating means and electric field addressing means, said smectic-isotropic phase transition consisting of a smectic phase and an isotropic phase.

2. The display device as claimed in claim 1, wherein said heating means are formed of heating strips which have successively flowing therethrough a heating current and the means for addressing the electric field are formed, on the one hand, by the heating strips and, on the other hand, by an electrode array of further strips, the liquid crystal layer being disposed between said strips and said electrode array.

3. The display device as claimed in claim 1, wherein said heating means are formed by a laser beam scanning said layer and the electric field addressing means are formed by two electrodes enclosing said layer.

4. The display device as claimed in claim 1, wherein said layer is a mixture of liquid crystals, said mixture being doped.

5. The display device as claimed in claim 4, wherein said mixture comprises a smectic liquid crystal having the composition:

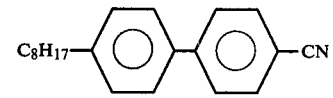

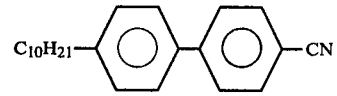

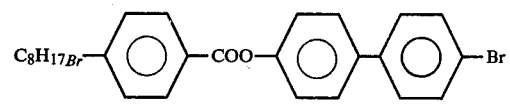

said doping agent being bicyclootene-2 in a proportion more than 10%.

* * * * *